Figure 4:
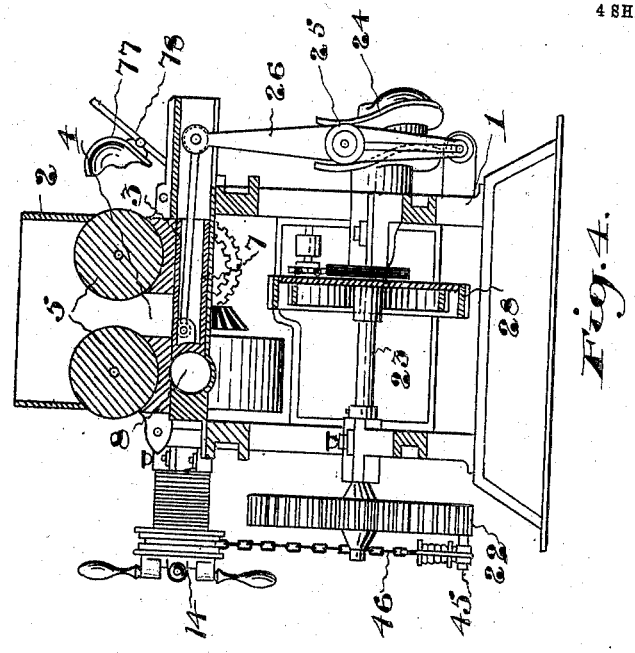

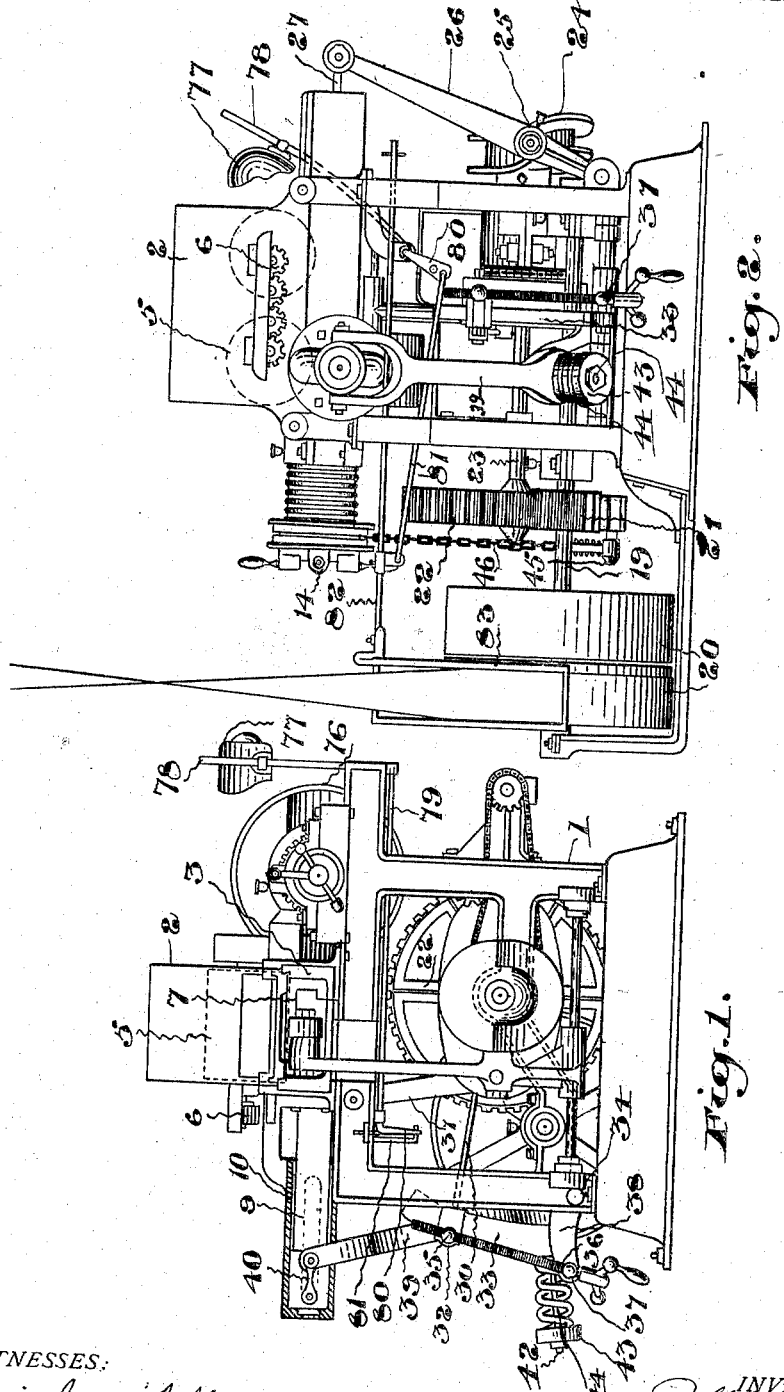

R. J. F. & A. E. ALDRED.
DOUGH DIVIDER.
APPLICATION FILED NOV. 23, 1908.

967,700.

Patented Aug. 16, 1910.
4 SHEETS—SHEET 2.

WITNESSES:
A. Campbell

INVENTORS
Rob't J. F. Aldred
Alfred E. Aldred
BY
ATTORNEYS

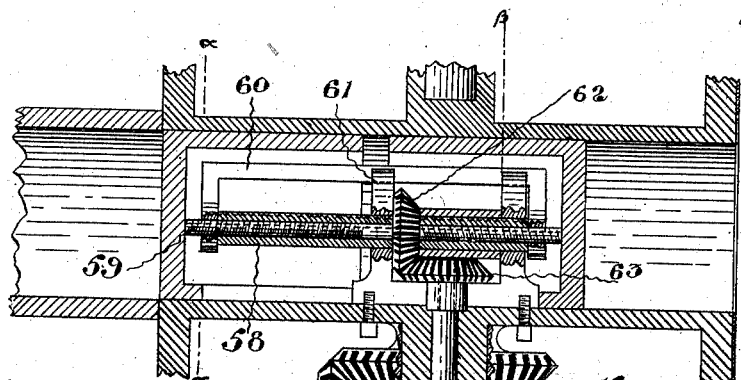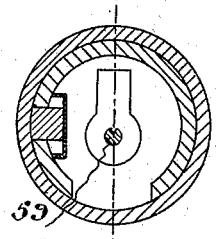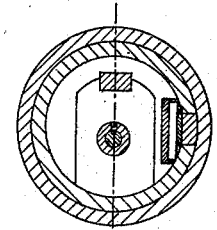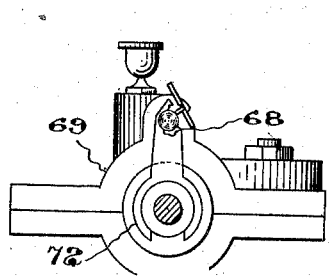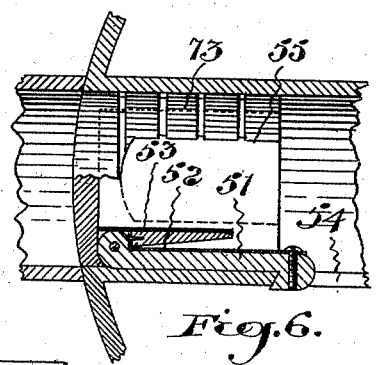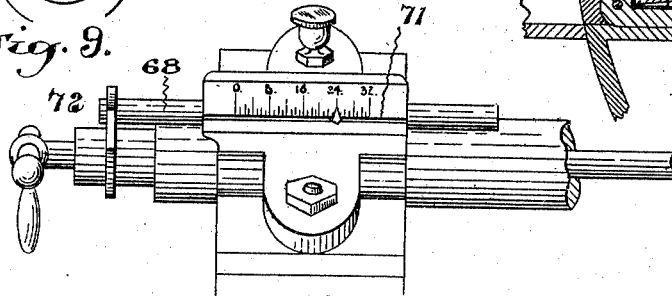

R. J. F. & A. E. ALDRED.
DOUGH DIVIDER.
APPLICATION FILED NOV. 23, 1908.

967,700.

Patented Aug. 16, 1910.
4 SHEETS—SHEET 4.

WITNESSES:
Annie Campbell
J.W.E. Kendrick

INVENTORS
Robt. J. F. Aldred
Alfred E. Aldred
BY Ridout & Maybee
ATTORNEYS.

UNITED STATES PATENT OFFICE.

ROBERT JAMES FREDERICK ALDRED AND ALFRED EDWIN ALDRED, OF GLENCOE, ONTARIO, CANADA.

DOUGH-DIVIDER.

967,700.  Specification of Letters Patent.  Patented Aug. 16, 1910.

Application filed November 23, 1908. Serial No. 464,194.

*To all whom it may concern:*

Be it known that we, ROBERT JAMES FREDERICK ALDRED and ALFRED EDWIN ALDRED, of the town of Glencoe, in the Province of Ontario, Canada, have invented certain new and useful Improvements in Dough-Dividers, of which the following is a specification.

This invention relates to dough dividers of the type in which the dough is fed from a hopper into chambers in a rotating measuring head and our object is to devise an efficient and accurate machine of that type which will be as small and simple as possible in construction relative to its capacity.

Briefly the construction of the machine is as follows:—

The dough is fed from a hopper by a pair of rolls into a feed chamber in which a feeder is reciprocated. The feeder forces the dough in front of it into a tubular plunger chamber located at one side of the feed chamber and cuts it off from the dough in the hopper. A plunger forces the dough from the plunger chamber into one of a pair of opposed chambers in a rotating measuring head. The bottoms of the chambers are formed by movable followers having adjustable spacing mechanism between arranged so that the filling of one chamber with dough moves both followers and ejects the dough from the previously filled chamber.

The parts are operated and timed so that the feed rollers operate only when the head is being rotated.

Our invention lies particularly in certain features of the feeding mechanism; in certain features of the arrangement of and means of adjusting the followers in the measuring head; in the means of indicating the adjustment of the followers which regulates the size of the portions of dough; in the means employed to adjust the stroke of the plunger and give it a resilient backing; in the means employed to prevent jar in starting and stopping the intermittently rotated head; in a safety device intended to prevent the operator having his fingers caught between the edges of the outer measuring chamber and in a scraper employed to keep the periphery of the head clear of dough, and in means to prevent hammering of the followers in the measuring head when the machine is run empty, all substantially as hereinafter more specifically described and then definitely claimed.

Figure 3:
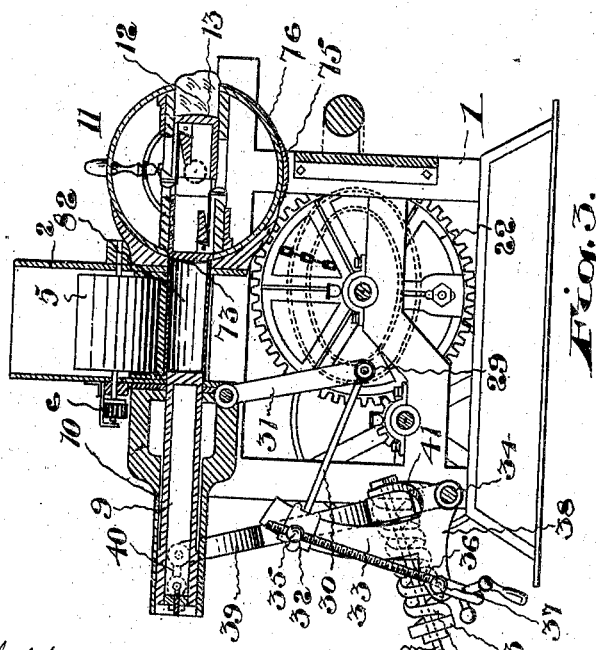
Figure 11:
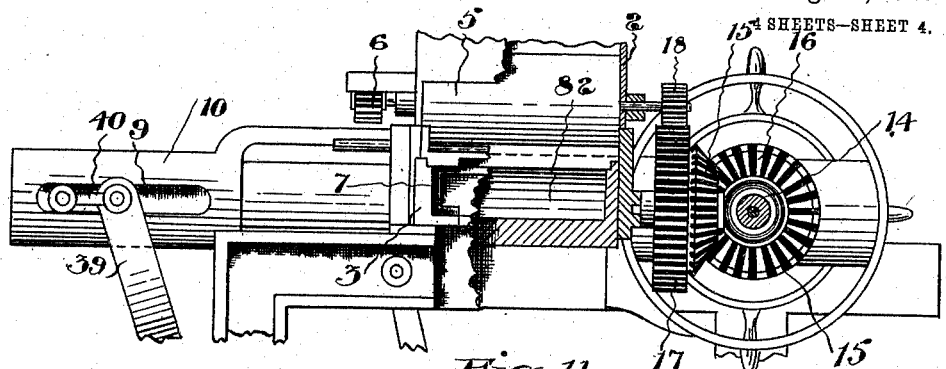
Figures 13, 14:
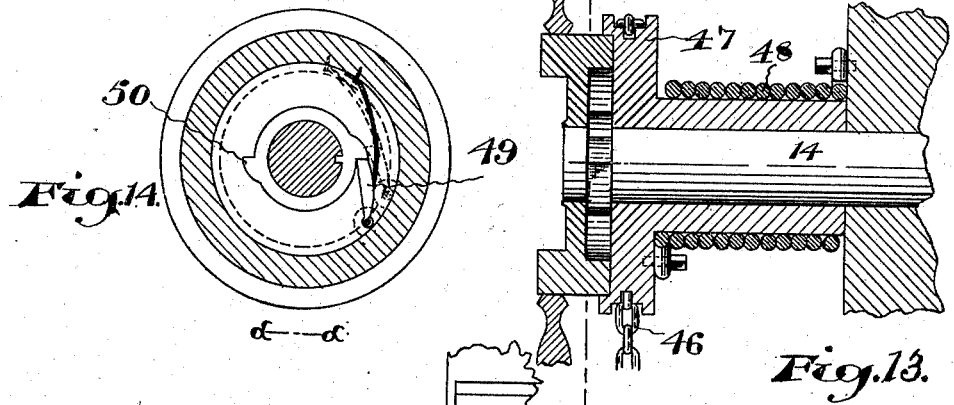
Figure 12:
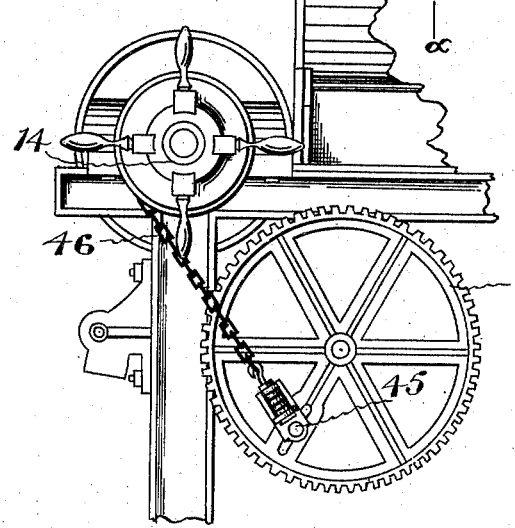

Figure 1 is a side elevation of the divider, partly in section. Fig. 2 is an end view of the divider. Fig. 3 is a longitudinal section of the machine. Fig. 4 is a cross section of the machine. Fig. 5 is a sectional detail, illustrating the adjusting means for the followers in the measuring head. Fig. 6 is a sectional detail, illustrating the means used for retaining the followers in position. Fig. 7 is a section on the line $a$—$a$ Fig. 5. Fig. 8 is a section on the line $b$—$b$ Fig. 5. Fig. 9 is an end view of the indicating mechanism of the follower adjustment. Fig. 10 is a side view of the same. Fig. 11 is a detail in side elevation, illustrating means for driving the feed rollers. Fig. 12 is a detail, showing in end elevation mechanism for intermittently rotating the measuring head. Fig. 13 is a longitudinal section of part of the same. Fig. 14 is a section on the line $a$—$a$ Fig. 13.

In the drawings like letters of reference indicate corresponding parts in the different figures.

1 is the frame of the machine suitably shaped to support the different parts. On this frame is supported a hopper 2. Below the hopper is located the feed chamber 3, communicating by an opening 4 with the hopper.

At the bottom of the hopper are located a pair of feed rollers 5, one on each side of the opening 4. These rollers are geared together by means of a series of gear wheels 6, so that they may be rotated each to move downwardly at its inner side. In the inner feed chamber is movable the feeder 7. The front edge of this feeder is curved as shown, to enable it to cut off dough fed through the opening 4, and also to enable it to form one side of a tubular chamber 8 formed at one side of the feed chamber below one of the rollers 5. The method of operating the feeder will be hereinafter described.

In the chamber 8 the plunger 9 is reciprocated. This plunger is guided in the tubular guide 10 formed on the frame of the machine. The plunger is operated as hereinafter described.

In front of the open end of the plunger chamber is rotatably supported the cylindrical measuring head 11 in which are formed two alined measuring chambers 12 preferably cylindrical in form. Each chamber is provided with a follower 13 which forms the bottom of the chamber, and these followers are connected as hereinafter described so that the pushing in of one follower pushes out the opposed follower. See Figs. 3 and 5.

The measuring head 11 is provided with an axle 14 suitably journaled in the frame and at one side of the head provided with a bevel gear 15 meshing with a bevel gear 16 fast on the spur 17 journaled on a stud on the frame of the machine. This spur gear meshes with the spur pinion 18 fast on the spindle of one of the feed rollers 5. Thus the feed rollers are operated each time that the measuring head is moved. See Fig. 11.

The operation of the device as so far described is as follows: Supposing the parts to be in the position shown in the drawing, the plunger 9 is pushed forward forcing any dough in the plunger chamber into one of the measuring chambers 12, and pushing out the portion of dough in the opposite measuring chambers. The plunger and the feeder are withdrawn and the head rotated subsequent to the withdrawal of the feeder. The feed rollers by rotation of the measuring head are rotated to force a fresh supply of dough down in front of the feeder. As soon as the head has brought an empty measuring chamber in line with the plunger tube its movement ceases and at the same time the feed rollers stop. The feeder is then moved forward to the position shown in Fig. 4 and everything is then ready for the forward movement of the plunger which forces the quantity of dough cut off into the measuring chamber, or at least such portion of it as the measuring chambers are adjusted to contain, as will hereinafter be described.

The movements of the parts are obtained by the following mechanism: The main shaft 19 is journaled on the frame and is provided with fast and loose pulleys 20. On the shaft 19 is a gear pinion 21 meshing with the gear wheel 22 fast on the cam shaft 23. On the end of the cam shaft is secured the rim cam 24 which engages a roller 25 on the rock arm 26 pivoted at its lower end on the frame of the machine and at its upper end pivotally connected with the connecting rod 27. This feeder is preferably hollow, as shown in Fig. 4, and the connecting rod is pivoted within the hollow interior of the feeder close to its front end. (See Figs 2 and 4.) The cam shaft 23 also carries a cam 28 having a cam groove formed in its face (see particularly Figs. 3 and 4). With this cam groove engages a roller 29 at the end of the connecting rod 30. The end of this connecting rod is supported by a link 31 pivoted on the same center as the roller 29 and also pivotally connected at its upper end with the frame of the machine. The outer end of the connecting rod 30 is provided with a slide 32 adapted to move on the curved arm 33 fulcrumed on the shaft 34.

The curve of the arm 33 is struck on a radius having a center at the center of the roller 29. Thus when the connecting rod is operated by the cam the curved arm will always move backward to the same position, no matter what the position of the slide 32 on the arm may be, but the extent of the forward rock will depend on the distance of the slide 32 from the shaft 34. To adjust this slide a nut 35 is journaled on the side of the slide and with this nut engages the threaded spindle 36 which is guided by and is rotatable in the stud 37 pivoted in a heel 38 formed on the arm 33.

The plunger derives its motion from the curved arm 33 as follows: A second arm 39 is pivoted on the shaft 34 and is connected at its upper end with a plunger 9 by the pivoted link 40. An offset 41 is formed on the arm 33 which passes in front of the arm 39. A bolt 42 passes through this offset and through the arm 39. A collar 43 is secured on the outer end of this arm and between the collar and the arm on the bolt is placed a coil spring 44, preferably in compression. The result of this construction is that the plunger will be forced forward until the resistance of the dough is greater than the resistance of the coil spring 44, when the latter will yield and no further movement will be imparted to the plunger by any continued movement of the curved arm 33. This arrangement obviates the necessity of using the elaborate system of weights and levers frequently employed to attain the same end.

The head is rotated by the following mechanism: On the gear wheel 22 is secured a wrist pin 45 to which is secured one end of the chain 46, in a manner shortly to be described. This chain is wrapped on the sleeve 47 loose on the outer end of the axle 14 of the head 11. This sleeve is actuated by the coil spring 48 fast at one end to the sleeve and at the other to some stationary part of the frame. The rotation of the gear wheel 22 alternately pulls upon and slackens the chain 46. The sleeve is thus partly rotated in one direction by the pull of the chain and then rotated in the reverse direction by the action of the coil spring 48.

The sleeve carries a spring actuated pawl 49 which engages with the ratchet wheel 50 fast on the end of the axle 14. The rocking movement of the sleeve is thus converted into an intermittent rotary movement of the axle 14 and consequently of the measuring head 11. (See Figs. 13 and 14.)

Reverting now to the measuring head and the followers 13 in the measuring chambers 12, the arrangement of these followers and their adjusting mechanism will be described. On reference particularly to Figs. 5 to 8 it will be seen that each follower comprises a hollow cylinder closed at its outer end. On each follower is pivoted a latch 51 actuated by the spring 52. The latch lies partly within a casing 53, to which one end of the spring is secured, the other end being secured to the latch. The head of the latch is hooked and passes into a slot 54. This slot is of a sufficient length to allow the follower to be pushed in as far as may be necessary, and having its outer end so located that when the latch is engaged with it, as shown in Fig. 6, the head of the follower is substantially flush with the periphery of the measuring head. These slots are arranged out of alinement with each other (see Fig. 3) and cannot contact and thereby limit the inward movement of the followers.

An opening 55 is formed in each side of the head follower through which the latch may be reached. The latches may thus be reached from outside the machine and pressed in to permit of the followers being removed when necessary. The followers are held adjustably spaced in such a manner that they may slide in and out, as already described, by the following mechanism: Within the head are secured brackets 57 in which is freely slidable a sleeve 58. This sleeve is internally threaded, the threads being right hand at one end of the sleeve and left hand at the other. Into the sleeve are screwed two threaded rods or screws 59, which contact with the ends of the followers but have no connection therewith. These rods pass through and have a feather key and slot engagement with the ends of a yoke 60 (see Figs. 5 and 7), and this yoke is guided in grooves 61 formed in the brackets 57, which thus form guides to retain the yoke from rotation while permitting it to slide freely. It is evident that by rotating the sleeve 58 the screws 59 will be moved in or out as they are held from rotating by the yoke. The distance between the ends of the screws and consequently between the ends of the followers is thus adjusted, and this adjustment of the followers of course regulates the size of the loaf, as is well known in the art. To rotate this sleeve we provide the bevel pinion 62 through which the sleeve is slidable with a feather key and slot connection (see Figs. 5 and 8). The bevel pinion fits close to one of the brackets 57 and a sleeve is placed between it and the adjacent bracket, so that the pinion is held from endwise movement.

The bevel pinion 62 meshes with the bevel pinion 63 fast on the spindle 64 which extends axially through one part of the axle 14. The spindle is held from endwise movement in the axle by the set screw 65 which is screwed through the axle 14 to engage an annular groove formed in the spindle.

The outer end of the axle is counterbored to receive the sleeve 66 which is internally threaded to engage a similar thread formed on the spindle 64. This sleeve is held from rotating by means of a set screw 67 which is screwed through the axle and engages a longitudinal key seat formed in the sleeve. The rotation of the spindle will thus impart a longitudinal movement to the sleeve and this longitudinal movement of the sleeve will serve to indicate the adjustment of the followers 13. To facilitate this indication a rod 68 is provided movable through a hole formed in the upper part of the bearing bracket 69 of the axle 14. An index finger 70 is secured to this rod and passes through a slot 71 formed in the bearing. Behind the end of the finger a scale of ounces is placed. The rod 68 is moved by a fork 72 which is secured to one end of the rod and engages an annular groove formed in the end of the sleeve 66.

A crank handle 73 is provided at the outer end of the spindle 64. By rotating this crank the followers are adjusted and the size of the loaf being formed will be indicated by the index 70.

It will be seen that the adjustment described permits of the followers being alternately pushed from one side to the other, as the yoke and the sleeve both slide freely in the brackets 57 and at the same time there is absolutely no connection between the followers and the adjusting mechanism. A slot 55 must be formed in the side of each follower to allow it to slide past the brackets 57.

It will be remembered that reference was made to a special connection between the chain 48 and the wrist pin 45. This is preferably by means of a draft spring 74, the purpose of which is to ease the shock to the mechanism caused by the effort of suddenly starting the measuring head at rest to a comparatively high rate of speed. (See Figs. 4 and 12.)

A brake on the rotation of the measuring head is provided by the curved plate 75 which fits close against the underside of the periphery of the head. This plate also serves to prevent the jar which results from the sudden dropping of the followers if the machine be in motion with no dough passing through it. The curved plate forms an air cushion below the mouth of the chamber which is undermost as the head rotates and brings the measuring chambers toward a vertical position and checks the sliding movement of the followers. This curved plate may be continued as a scraper 76, which cleans off the surface of the measuring head from any dough or flour which might otherwise stick thereto. (See Fig. 3.)

Operators might be injured if for any reason they endeavored to reach into the outer measuring chamber while the device was in movement as their fingers might be caught between the descending upper edge of the measuring chamber and the scraper 76. We therefore provide a shield 77 suitably shaped to cover over the mouth of the outer measuring chamber. This is secured to an arm 78 (see Figs. 1 and 2) which is secured to the rock shaft 79 journaled on the frame of the machine. The other end of this rock shaft has a rock arm 80 formed thereon which by means of a pivoted connecting rod 81 is connected with the belt shifter 82 which is horizontally slidable in the arm of the machine, as shown. This belt shifter is provided with a suitable loop 83 passing around the belt as shown. The result of this arrangement is that to start the machine it is necessary to move the belt shifter. This will usually be done by moving the arm 78 carrying the shield, so that the shield is placed in position simultaneously with the starting of the machine and access to the outer measuring chamber can only be had after the machine has been stopped.

It will be noted that a hand wheel 84 is placed on the end of the axle 14 whereby it may be moved independent of the automatic mechanism and the hub of this wheel is recessed to cover the panel 49 and ratchet wheel 50.

What we claim as our invention is:—

1. In a dough divider, the combination of a dough feeding chamber, a plunger chamber communicating therewith, a reciprocating feeding member in said feeding chamber adapted to feed dough into said plunger chamber, a plunger reciprocating in said plunger chamber and a mold coöperating with said plunger and plunger chamber to receive the dough.

2. In a dough divider, the combination of primary dough feeding means, secondary dough feeding means in communication therewith and comprising a feeding chamber and a feeder reciprocating therein, a plunger chamber out of alinement with said feeding chamber and communicating therewith, a plunger reciprocating in said plunger chamber and a mold coöperating with said plunger chamber.

3. In a dough divider, the combination of a feed chamber having an opening therein; a plunger chamber fixedly located out of alinement with the feed chamber; a feeder reciprocating in the feed chamber and adapted to force dough into the aforesaid plunger chamber; a plunger reciprocating in the plunger chamber at an angle to the feeder; a hopper communicating with the opening in the feed chamber, and feed rollers at the bottom on each side of the opening of the feed chamber.

4. In a dough divider, the combination of a hopper; feed rollers therein, a plunger chamber and a plunger therein; a rotating mold coöperating with said plunger chamber and plunger and means operated by the rotation of said mold for operating the said feed rollers.

5. In a dough divider the combination of a feed chamber having an opening in its upper side; a plunger chamber located at one side of the feed chamber; a feeder reciprocating in the feed chamber; a plunger reciprocating in the plunger chamber; a hopper communicating with the opening of the feed chamber; and a pair of feed rollers at the bottom of the hopper one at each side of the opening of the feed chamber; an intermittently rotated head provided with measuring chambers which may be brought into alinement with the plunger chamber; and means whereby the feed rollers are operated simultaneously with the said head.

6. In a dough divider, a measuring head comprising a drum having therein two alined cylindrical chambers, each with a slot in its wall out of alinement with the slot in the opposing chamber; two independent followers in said chambers; hooks or latches connected to said followers and adapted to engage in the aforesaid slots and adjustable spacing means between said followers unconnected with either.

7. In a dough divider a measuring head comprising a drum having two alined cylindrical chambers formed therein; two independently slidable removable followers in said chambers; and adjustable independently slidable spacing means between said followers unconnected with either.

8. In a dough divider a measuring head comprising a drum having two alined cylindrical chambers formed therein each with a slot in its wall; two independently slidable followers in said chambers; and spring actuated hooks or latches pivoted on said followers and adapted to engage in the aforesaid slots.

9. In a dough divider a measuring head comprising a drum having two alined cylindrical chambers formed therein each with a slot in its wall; two independently slidable followers in said chambers; hooks or latches pivoted on said followers and adapted to engage in the aforesaid slots; and adjustable independently slidable spacing means between said followers unconnected with either.

10. In a measuring head provided with alined cylindrical chambers each having a follower, spacing mechanism for the followers comprising an internally right and left hand threaded sleeve; screws screwed into said sleeve and adapted to engage the followers; a yoke through the ends of which the screws pass; feather key and slot connections between the ends of the screws and the yoke; a guide carried by the head through which the yoke is slidable; and means for rotating the sleeve adapted to permit of the endwise movement of the sleeve.

11. In a measuring head provided with alined cylindrical chambers each having a follower, spacing mechanism for the followers comprising an internally right and left hand threaded sleeve; screws screwed into said sleeve and adapted to engage the followers; a yoke through the ends of which the screws pass; feather key and slot connections between the ends of the screws and the yoke; a guide carried by the head through which the yoke is slidable; means for rotating the sleeve adapted to permit of the endwise movement of the sleeve; a bevel pinion on the sleeve, a feather key and slot connection between the pinion and the sleeve; a spindle extending through the axis of the head; and a pinion on said spindle meshing with the pinion on the sleeve.

12. In a measuring head provided with alined cylindrical chambers each having a follower, spacing mechanism for the followers comprising an internally right and left hand threaded sleeve; screws screwed into said sleeve and adapted to engage the followers; a yoke through the ends of which the screws pass; feather key and slot connections between the ends of the screws and the yoke; a guide carried by the head through which the yoke is slidable; means for rotating the sleeve adapted to permit of the endwise movement of the sleeve; a bevel pinion on the sleeve; a feather key and slot connection between the pinion and the sleeve; a spindle extending through the axis of the head; a pinion on said spindle meshing with the pinion on the sleeve; a sleeve having a threaded engagement with the spindle; and means for holding said sleeve from rotating while permitting it to move longitudinally.

13. In a measuring head provided with alined cylindrical chambers each having a follower, spacing mechanism for the followers comprising an internally right and left hand threaded sleeve; screws screwed into said sleeve and adapted to engage the followers; a yoke through the ends of which the screws pass; feather key and slot connections between the ends of the screws and the yoke; a guide carried by the head through which the yoke is slidable; means for rotating the sleeve adapted to permit of the endwise movement of the sleeve; a bevel pinion on the sleeve; a feather key and slot connection between the pinion and the sleeve; a spindle extending through the axis of the head; a pinion on said spindle meshing with the pinion on the sleeve; a sleeve having a threaded engagement with the spindle; means for holding said sleeve from rotating while permitting it to move longitudinally; an index finger adapted to be moved by the sleeve; a scale on a stationary part over which said finger may move.

14. The combination of a measuring head provided with alined measuring chambers and followers therein; adjustable means for spacing said followers; an axle for the head; a spindle extending through the axle of the head and geared directly to the spacing means; a sleeve adapted to adjust the spacing means threaded on the spindle within the axle and extending out through the end thereof; means adjacent to the inner end of the spindle preventing its longitudinal movement while permitting its rotation; and means independent of the adjusting mechanism for holding said sleeve from rotating while permitting it to move longitudinally.

15. The combination of a measuring head provided with alined measuring chambers and followers therein; adjustable means for spacing said followers; an axle for the head; a spindle extending through the axle of the head and geared directly to the spacing means; a sleeve adapted to adjust the spacing means threaded on the spindle within the axle and extending out through the end thereof; means adjacent to the inner end of the spindle preventing its longitudinal movement while permitting its rotation; means independent of the adjusting mechanism for holding said sleeve from rotating while permitting it to move longitudinally; an index finger adapted to be moved by the sleeve; and a scale on a stationary part over which said finger may move.

16. In a dough-divider, plunger operating mechanism comprising a shaft; an arm thereon; a second arm thereon; a spring connection between the two arms; and a plunger to which the second arm is suitably connected.

17. In a dough-divider, plunger operating mechanism comprising a shaft; an arm thereon; a second arm thereon; an offset on the first arm; a bolt passing through said offset and through the second arm; a collar on said bolt; a coil spring on the bolt between the collar and the second arm; and a plunger to which the second arm is suitably connected.

18. In a dough-divider, plunger operating mechanism comprising a shaft; a curved arm thereon; a slide adjustable on said arm; means connected with said slide for rocking the arm; a second arm on the shaft; a spring connection between the two arms; and a plunger to which the second arm is suitably connected.

19. In a belt driven dough-divider provided with a rotatable cylindrical measuring head having measuring chambers formed therein opening through the periphery of the head; a shield movable to and from a position over the outer side of the periphery of the head; a belt shifter; and means whereby the shifting of the belt moves said shield.

20. In a dough-divider provided with starting and stopping mechanism and with a rotatable cylindrical measuring head having measuring chambers formed therein opening through the periphery of the head; a shield movable to and from a position over the outer side of the periphery of the head; and means whereby the starting and stopping of the machine moves the shield.

21. In a dough-divider the combination of a feed chamber having an opening in its upper side; a plunger chamber fixedly located out of alinement with the feed chamber; a feeder reciprocating in the feed chamber; a plunger reciprocating in the plunger chamber; and a hopper communicating with the opening in the feed chamber.

22. In a dough-divider the combination of a feed chamber having an opening in its upper side; a plunger chamber fixedly located out of alinement with the feed chamber; a feeder reciprocating in the feed chamber; a plunger reciprocating in the plunger chamber; a hopper communicating with the opening in the feed chamber; and an intermittently rotated head provided with measuring chambers which may be brought into alinement with the plunger chamber.

Glencoe this 6th day of November, 1908.

ROBERT JAMES FREDERICK ALDRED.
ALFRED EDWIN ALDRED.

Signed in the presence of—
P. D. KEITH,
ALEX DUNCANSON.